(12) United States Patent
Baldi et al.

(10) Patent No.: US 7,188,592 B2
(45) Date of Patent: Mar. 13, 2007

(54) POSITION SENSOR OF A VALVE ACTUATOR FOR AN INTERNAL COMBUSTION ENGINE

(75) Inventors: Christophe Baldi, Paris (FR); Daniel Lalu, Cesson (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 70 days.

(21) Appl. No.: 11/100,057

(22) Filed: Apr. 6, 2005

(65) Prior Publication Data
US 2005/0231194 A1    Oct. 20, 2005

(30) Foreign Application Priority Data
Apr. 6, 2004    (FR) .................................. 04 03617

(51) Int. Cl.
*F01L 9/04* (2006.01)
(52) U.S. Cl. .............. 123/90.11; 251/129.01; 251/129.05; 324/207.17
(58) Field of Classification Search ............ 123/90.11; 251/129.01, 129.05, 129.09, 129.15; 324/207.15, 324/207.16, 207.17, 207.18, 207.19; 318/653
See application file for complete search history.

(56) References Cited
U.S. PATENT DOCUMENTS

| | | |
|---|---|---|
| 4,100,480 A | 7/1978 | Lytle et al. |
| 6,397,798 B1 * | 6/2002 | Fiaccabrino ............ 123/90.11 |
| 6,642,711 B2 * | 11/2003 | Kawate et al. ......... 324/207.17 |
| 6,681,728 B2 | 1/2004 | Haghgooie et al. |
| 2002/0097042 A1 | 7/2002 | Kawate et al. |

FOREIGN PATENT DOCUMENTS

| | | |
|---|---|---|
| DE | 3329515 | 3/1985 |
| DE | 3602107 | 7/1987 |

OTHER PUBLICATIONS

David S. Nyce, "Linear Position Sensors", Jan. 21, 2004, John Wiley & Sons, ONLINE, XP002312335, ISBN: 0-471-23326-9, Extrait de l'Internet: URL: http://www3.interscience.wiley.com/cgi-gin/booktoc/107063525/> * pp. 94-108; figure 6.7.
Int'l Search Report for FR 0403617/FA 648983.
EPO Search Report for App. No. EP 05 30 0178.

* cited by examiner

*Primary Examiner*—Ching Chang
(74) *Attorney, Agent, or Firm*—RatnerPrestia

(57) ABSTRACT

A sensor of the position of a target is secured to an electromagnetic or electromechanical valve actuator of an internal combustion engine. The target is driven by a reciprocating translatory motion ($f_+$, $f_-$) in synchronism with that of the valve. The sensor uses an eddy current transducer, including two secondary coils connected in series opposition and a primary coil fed by a radio frequency current. The output signal of the transducer is sent to a phase locked loop synchronous detector. The coils are engraved or printed on a flexible film. The transducer is arranged in an external tube made of aluminum and includes an internal wall made of insulating material.

17 Claims, 4 Drawing Sheets

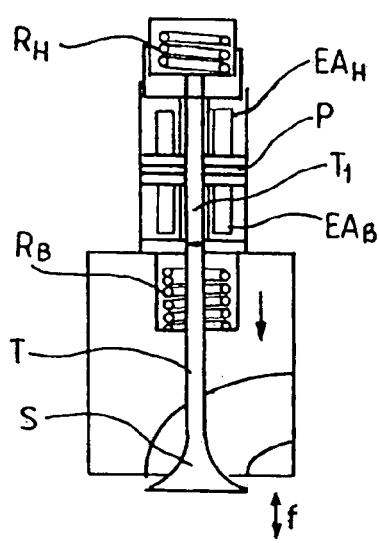
FIG_1
PRIOR ART
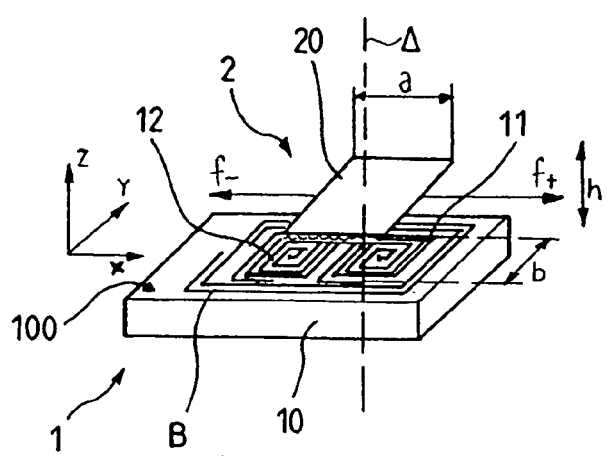
FIG_2A
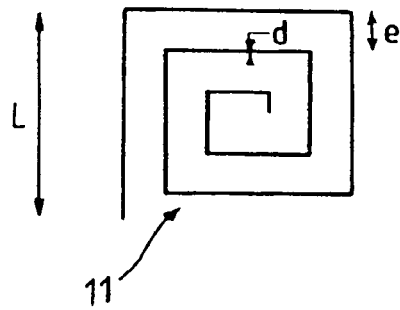
FIG_2B
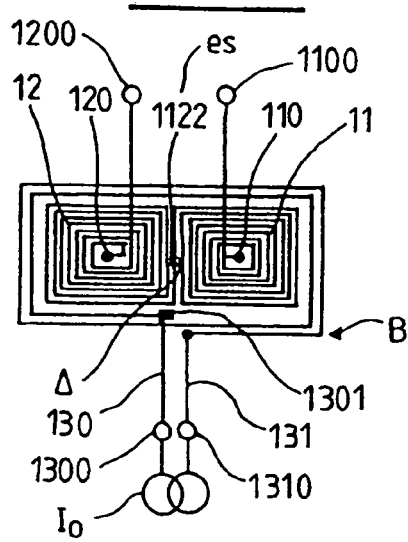
FIG_2C
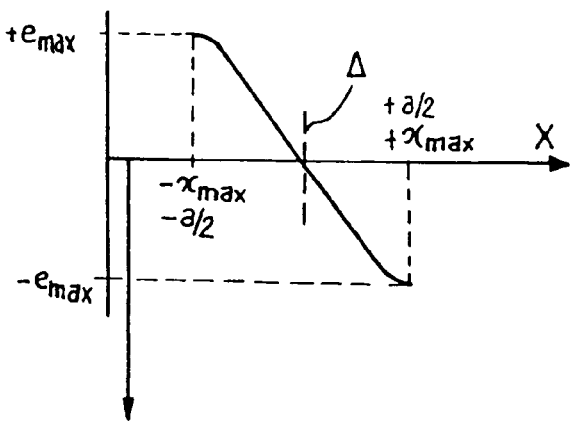
FIG_2D

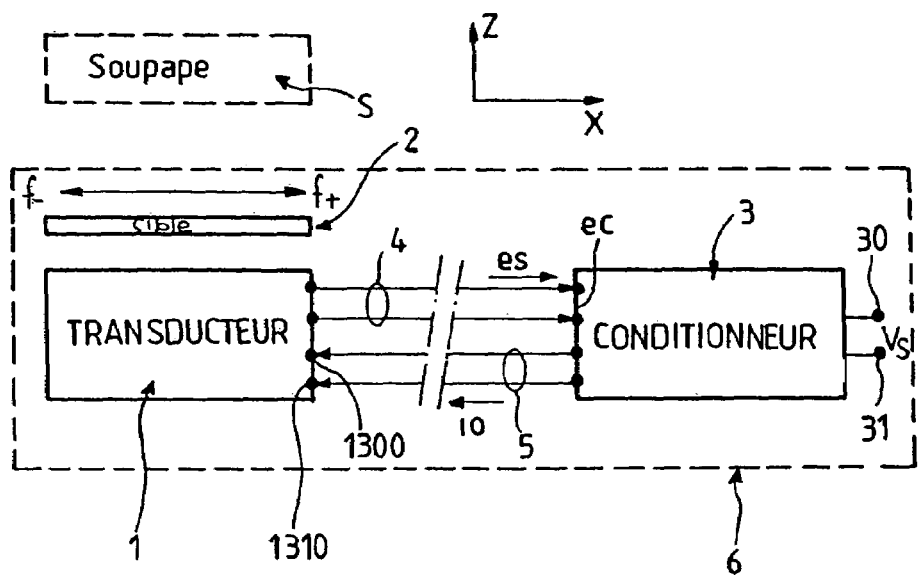
FIG_3
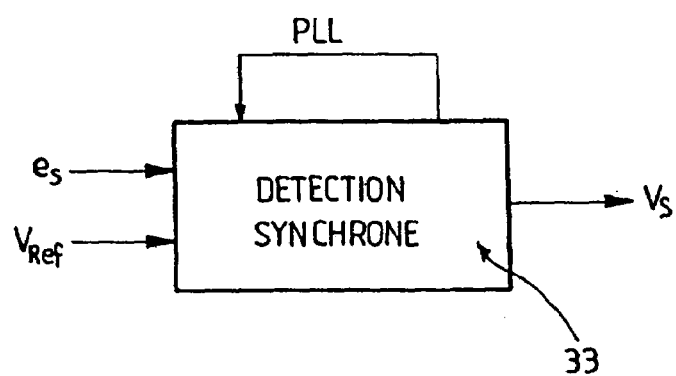
FIG_4

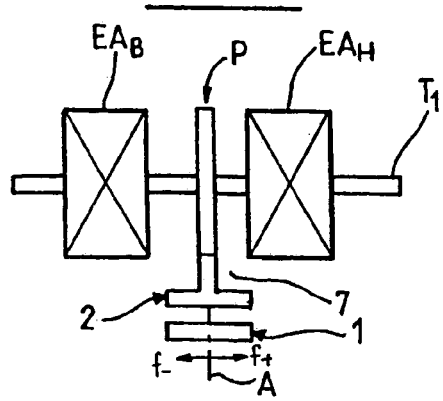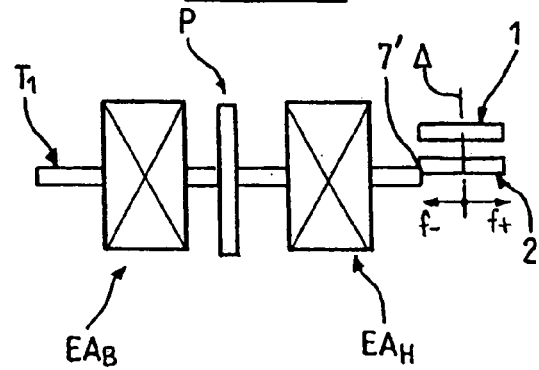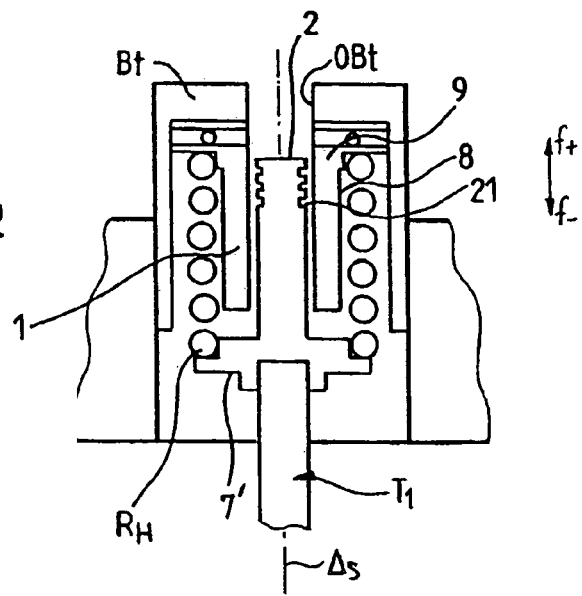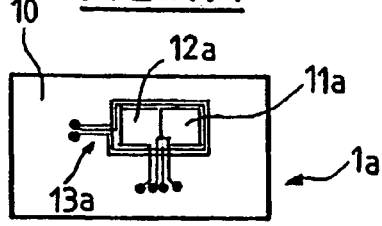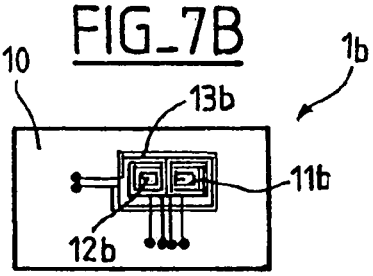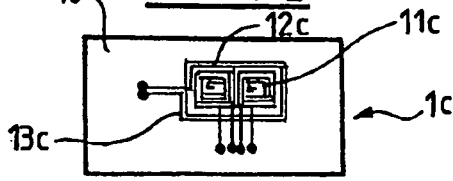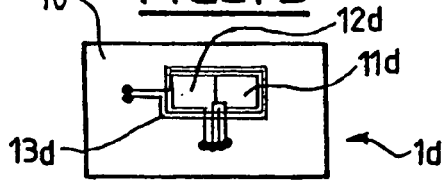

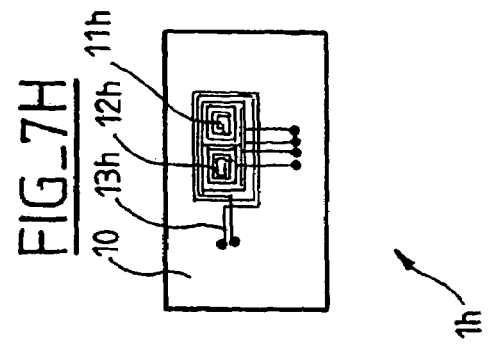
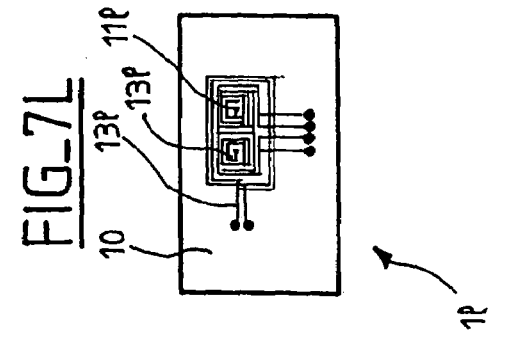
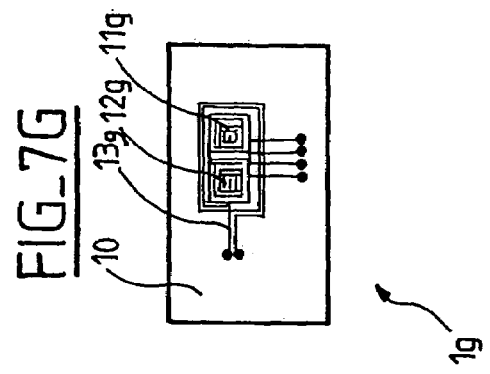
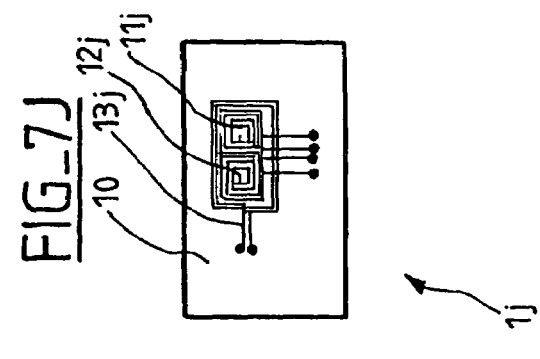
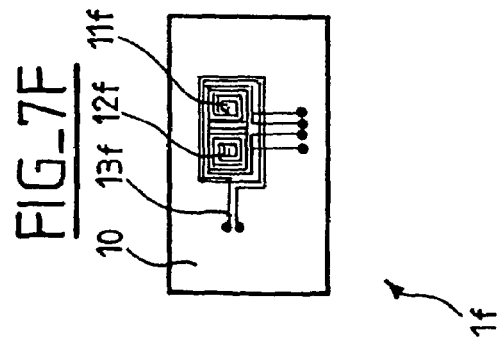
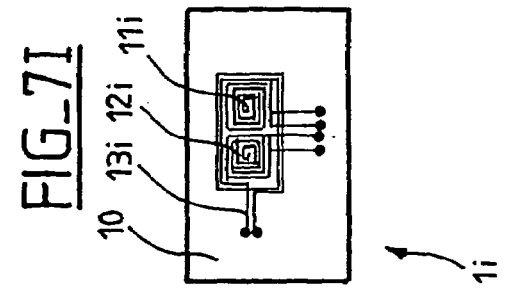
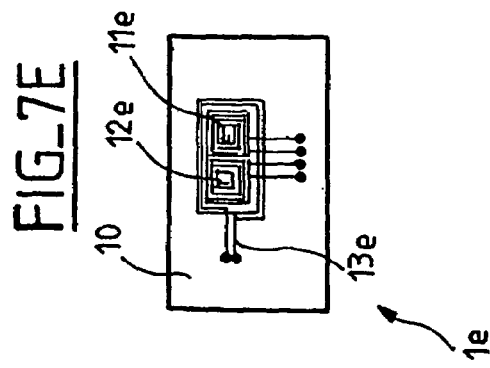

POSITION SENSOR OF A VALVE ACTUATOR FOR AN INTERNAL COMBUSTION ENGINE

FIELD OF THE INVENTION

The present invention pertains to a position sensor of a valve actuator for an internal combustion engine, in particular of a motor vehicle.

BACKGROUND

In motor vehicles, it is expected that the valves can be controlled by an electromagnetic or electromechanical type actuator.

An electromagnetic or electromechanical valve actuator usually comprises a mobile armature, called a plate or blade, and two fixed solenoids.

Such a structure is schematically illustrated by FIG. 1.

The mobile armature P moves between the two solenoids, which shall be arbitrarily called high $EA_H$ and low $EA_B$, and controls the movement of the rod T or stem of the valve S in combination with two springs $R_H$ and $R_B$.

The two solenoids, $EA_H$ and $EA_B$, make it possible to maintain the mobile armature P in the high and low positions (the valve S in the closed and open position, respectively). They also make it possible to supply the energy necessary to overcome the frictions, so that the springs $R_B$ and $R_H$ can move the armature P. When the armature P moves toward the high position, the end of a rod $T_1$, which is immovably attached to the armature, moves away from the end of the rod T and the spring $R_B$ drives the rod T upwards to position the valve in the closed position. To position the valve in the open position, the armature P is moved downwards thanks to the attraction of the solenoid $EA_B$ and to the action of the spring $R_H$ and against the spring $R_B$, the rod $T_1$ thus forcing back the rod T.

The to-and-fro motions of the valve are symbolized in FIG. 1 by the double arrow f.

This structure makes the valve actuators noisy by nature because of the repeated impacts of the mobile armature P against the solenoids $EA_H$ and $EA_B$, the impacts of the end of the rod $T_1$ against the end of the rod T, as well as the impacts of the valve against its seat.

It is known that a good control of the noise level requires resorting to a so-called closed loop automatic control system, which utilizes information on the position of the plate P. To do this, it is necessary to use a sensor for the linear position of the plate P.

In the preferred field of application of the present invention, i.e., that of internal combustion engines whose valves are associated with electromagnetic or electromechanical type actuators, it is necessary to comply with a certain number of constraints or requirements for the creation of a linear sensor, in particular:

the requirement of the control of the noise level implies knowing the position of the plate with high precision, typically a resolution on the order of 10 µm;

the temperature operating range is broad, for example, ranging from −50° C. to +150° C.; and the range of the measurement concerns a relatively small motion, typically 8 mm, i.e., from +4 mm to −4 mm.

The environment in which the sensor is designed to operate is very difficult. The principal constraints that may have an effect on the properties and features of the sensor are as follows:

major temperature gradients capable of causing thermal drifts of the output signal of the sensor, random mechanical backlashes on the system, dilatation of the materials;

exposure to exterior electromagnetic fields capable of distorting the values of the output signal of the sensor;

exposure to a corrosive physicochemical environment: presence of moisture and of hydrocarbons, high rate of clogging, etc.

Finally, there is an additional major constraint that the sensor must comply with: It must take up little space, because it must be able to be integrated into a small available volume in the valve actuator.

In practice, a sensor comprises two principal components: a transducer generating an electric signal and a circuit, a so-called conditioner of this electric signal.

The transducer comprises at least one sensitive element which makes possible the detection of the movement of the valve S or of a piece that is secured to it, for example, the plate P, and the conversion of the associated mechanical magnitude into an electrical magnitude: an output electric signal.

The conditioner performs the shaping and electronic processing of the output signal that is generated by the transducer, so as to make it more exploitable by the above-mentioned closed loop automatic control circuits.

In practice as well, only the sensors using contactless technologies must be considered to be realistic, in view of the constraints explained above. Contactless sensors are also given preference in the automotive industry because of their reliability.

Theoretically, it would be possible to resort to various prior-art technologies, such as Hall effect sensors, capacitive sensors, inductive sensors (e.g., with a plunger core) or optical sensors.

However, these technologies are not without drawbacks. Thus, with the Hall effect sensors, the capacitive sensors or the inductive sensors, the transducer and the conditioner must be attached to each other. In fact, these sensors operate with low currents. If the transducer and the conditioner are moved away from one another, there is a risk of obtaining an excessively high signal to noise ratio and, therefore, of losing the useful signal.

The result of this is that, as concerns these types of sensors, the conditioner must be placed with the transducer in the above-mentioned thermal and corrosive physico-chemical environment, which is not suitable for a valve actuator.

It is also readily recognized that the optical sensors, using optical technology, can no longer be used because of a requirement of controlling clogging incompatible with the application considered.

The object of the present invention is to eliminate these drawbacks of the prior-art devices and to respond to the needs and requirements that are demonstrated in the applications appropriate for the present invention and some of which will be mentioned.

SUMMARY

Therefore, the present invention pertains to a position sensor of a valve actuator for an internal combustion engine, in particular of a motor vehicle, which comprises a transducer and a conditioner.

According to a first major feature, a technology using eddy currents is used for the creation of the transducer of the position sensor.

It is known that such sensors are without mechanical contact and supply linear or angular motion and velocity signals.

According to another feature of the present invention, the transducer is associated with a device, which shall hereinafter be called a target. This target is secured to a mobile device secured to a valve, whose instantaneous position it is desired to obtain, advantageously the above-mentioned plate or the rod associated with this plate. The position of this device is measured in relation to the position of the sensor itself. The target is a metal conducting electricity.

It was observed that such an eddy current sensor does make it possible to satisfy the severe constraints of the environment of an internal combustion engine.

In a preferred embodiment, the transducer has a differential structure. The differential mode of operation of the transducer has the advantage of being able to be free from interference signals which are mutually eliminated for the most part, as explained below.

The transducer uses windings forming coils, with electromagnetic coupling.

Also in a preferred embodiment, these windings are made in the form of flat coils printed or engraved on flexible circuits, advantageously on polyimide films, for example, based on Kapton® (registered trademark of the DuPont company).

Kapton® is a highly resistant material and can be used at very high temperatures, typically about 220° C., which makes it compatible with the applications appropriate to the present invention.

This arrangement has numerous advantages:

this material provides a thermal protection of the coils;

this material forms a protection against the corrosive physicochemical environment in which the coils of the transducer are dipped; and the flexibility of the flexible circuit makes it possible to insert a small transducer into the reduced environment available of the electromagnetic actuators.

In a preferred embodiment of the present invention, the conditioner uses synchronous detection technology.

In a more preferred variant, made possible in particular by the synchronous detection, the conditioner is offset in relation to the transducer, which makes it possible to perform telemetry.

This feature offers numerous advantages and, in particular, it makes it possible to be free from thermal and corrosive physicochemical environments. In fact, the conditioner can be placed in a location protected from major thermal gradients and physicochemical corrosions.

Moreover, offsetting the conditioner of the signals generated by the transducers, it becomes possible to use only one conditioner (for example, a conditioner created based on a single integrated circuit of the type called "Application Specific Integrated Circuit" or "ASIC," according to English terminology, for "Specialized Integrated Circuits") for processing all of the electric output signals coming from all the valves. It follows that the embodying of the conditioning system will only involve a relatively low cost and a simplification of the design by comparison to an embodiment in which a conditioner is provided by means of a valve.

Therefore, the principal object of the present invention is a sensor of the position of a first device secured to an electromagnetic or electromechanical valve actuator intended for an internal combustion engine, this device being driven by a reciprocating translatory motion, along a fixed direction, in synchronism with the motion of the plate of the actuator, characterized in that it comprises a second device, said target, made of an electrically conductive material, secured to the first device, so as to follow the reciprocating translatory motions, a transducer comprising a first, said primary, winding, fed by an alternating current of a fixed frequency, and said second and third windings connected according to a "series opposition" configuration by a first common end, in that the primary winding induces eddy currents in the target and is electromagnetically coupled to the second and third windings, these windings being additionally electromagnetically coupled, in that the windings are on a fixed substrate, symmetrically in relation to an axis linked with this substrate, so that a so-called output voltage, generated by the transducer and proportional to the difference in the voltages induced by the eddy currents in the second and third windings, respectively, is created, by electromagnetic induction, between the second ends of the second and third windings, and in that it comprises a so-called conditioner circuit, receiving, on a first input channel, the output voltage, and, on a second input channel, an alternating, so-called reference signal, having a frequency identical to the fixed frequency, the conditioner circuit comprising a synchronous demodulation circuit, so as to generate at the output an electric signal representative of the instantaneous position of the target along the fixed direction.

Preferably, the windings are arranged symmetrically in relation to an axis linked with the substrate.

In one embodiment, with the valve actuator comprising a plate arranged between two, said high and low, solenoids, the plate being attached to a rod driving a valve, the first device to which the target is secured is composed of the plate or the driving rod.

As a variant, the valve being extended by a valve stem device, the target is attached to this valve stem, which forms the first device and communicates the reciprocating translatory motion to it.

According to one embodiment, the fixed frequency is in the radio frequency range, for example, equal to about 200 kHz.

The target is, for example, a metal rod comprising at least one tooth arranged along the fixed direction. In this case, the electrically conductive material of the target is, for example, aluminum.

According to one embodiment, the first to third windings are composed of flat coils, which are engraved or printed on a flexible substrate. In this case, the flexible substrate is, for example, made of polyimide. The primary winding may comprise a plurality of turns that are coiled around secondary windings connected in "series opposition."

The synchronous demodulation circuit of the conditioner circuit may comprise a phase locked loop.

In one embodiment, with the actuator comprising a frame, the transducer and the target are arranged in an opening of this frame, which opening is closed by a plug for adjusting the rate of a spring and for positioning the sensor in relation to the target, the transducer being arranged coaxially to the target inside a tube forming an external wall. In this case, the tube is preferably made of a material offering protection against electromagnetic fields, for example, aluminum. The transducer may comprise an internal wall made of an electrically insulating material, for example, a plastic material.

According to one embodiment, the conditioner is at a distance from the transducer and from the target, and in that it receives the output voltage generated by the transducer by means of jumpers, so as to create a telemetry system. In this case, if the motor comprises a plurality of valves and valve actuators, and if each of the valves is associated with a transducer, then, preferably, the conditioner circuits receiving the output voltages generated by the transducers are rearranged in a single integrated circuit, for example, of the ASIC type.

BRIEF DESCRIPTION OF THE DRAWINGS

The present invention will now be described in greater detail; other advantages and features shall become apparent with reference to the attached drawings, among which:

FIG. 1 schematically shows an exemplary embodiment of an electromagnetic valve actuator for an internal combustion engine according to the prior art;

FIG. 2A schematically shows an eddy current position transducer cooperating with a target according to a preferred embodiment of the present invention;

FIG. 2B schematically shows the primary and secondary coil windings of the transducer of FIG. 2A;

FIG. 2C shows the layout of the primary and secondary coil windings of the transducer of FIG. 2A;

FIG. 2D shows the line graph of the output voltage of the transducer as a function of the motion of the target along an axis;

FIG. 3 schematically shows a conditioner circuit of the output voltage of the transducer using a synchronous detector;

FIG. 4 schematically shows the synchronous detector of the circuit of FIG. 3;

FIGS. 5A and 5B schematically show two configurations of eddy current position sensors according to the present invention;

FIG. 6 schematically shows an example of a practical embodiment of an eddy current position sensor according to the present invention; and FIGS. 7A through 7L schematically show examples of configurations of coil windings of a transducer on flexible circuits.

DETAILED DESCRIPTION

The following description refers, without any limitation in terms of the scope, to the context of the preferred application of the present invention, unless specified otherwise, i.e., in the case of a position sensor for an electromagnetic actuator for an internal combustion engine valve.

Such a sensor and embodiment variants will be described by reference to FIGS. 2 through 7L. The electromagnetic actuator may be identical or, at the very least, quite similar, as regards its general configuration, to that described with FIG. 1. The position sensor according to the present invention, and this constitutes an additional advantage, does not require a change to be made in this general configuration, only minor changes which will be explained in detail below.

In FIGS. 1 through 7L, identical elements have the same reference numbers and will only be re-described as needed.

As was indicated above, according to one of the major features of the present invention, the sensor resorts to eddy currents. It comprises three principal components: a transducer, a target and a conditioner.

FIG. 2A schematically shows the configuration of the first two components, the transducer, under the general reference 1, and the target, under the general reference 2, and the manner in which they cooperate.

FIG. 2A shows a system of orthonormed pitch, roll and yaw axes ZYX.

The transducer 1 consists essentially of a primary winding 13 and two, said secondary windings, 11 and 12, which form electromagnetic coils and are arranged on the upper wall 100 of a substrate 10. The secondary coils, 11 and 12, are arranged symmetrically on both sides of an axis A central to the substrate 10. The wall 100 is substantially flat. The axis A is parallel to the reference axis Z and at right angles to the wall 100, the latter therefore being parallel to the XY plane.

The transducer 1 is similar to a differential transformer composed of a primary circuit, the coil 13, and two secondary circuits, the coils 11 and 12, which are identical.

In a preferred embodiment, the primary circuit 13 and the two secondary circuits, 11 and 12, are composed of flat electromagnetic coils, formed by turns printed or engraved on the surface of a printed circuit composed of the substrate 10.

FIG. 2B schematically shows one of the coils, for example, the coil 12. It is characterized by a plurality of parameters:

the number of turns N, three in the example described;

the width of the turns d, i.e., the width of the engraved or printed lines;

the width between lines e; and the required width L of the coil.

FIG. 2C schematically shows the layout of the coils 11 through 13, in relation to one another, on the one hand, and in relation to the substrate 10 and to the central axis of symmetry Δ, on the other hand.

The symmetry of the transducer 1 makes it possible to become free from any external disturbances that may distort the measurement (noise signals, mechanical production defects, electromagnetic interference, etc.).

The two coils, 11 and 12, are mounted in series opposition and are connected by a main terminal 1122, at a point coinciding with the axis Δ. The central connections of the coils emerge under the substrate 10, via the metalized holes, for example, in the form of two couplings, 110 and 120, ending in terminations or terminals, 1100 and 1200, respectively.

The primary coil 13, which may also comprise a plurality of turns, surrounds the two secondary coils, 11 and 12. Two input terminals, 1300 and 1310, which extend via the couplings 130 and 131, respectively, are connected to the two ends of the coil 13. As above, a metalized hole 1301 may be provided so as to connect the internal end of the coil 13 to the input terminal 1300.

The transducer 1 must be symmetrical. In fact, the symmetry of the transducer 1 is a prime aspect, because it makes it possible to become free from any external disturbances that may distort the measurement (noise signal, mechanical production defects, electromagnetic interference, etc.).

Reference is again made to FIG. 2A. The target 2 is composed of a metal rod conducting electricity and having one or more teeth and thus one or more notches along the axis X (in parallel to the reciprocating translatory motion of the target 2). To simplify the description, first of all, it is assumed that the target comprises only one tooth 20 (or only one notch), as shown in FIG. 2A. The target 2 is carried by the plate P.

Each tooth 20 may be compared to a metal strip whose width is a, in the direction of movement of the mobile target 2 (i.e., in parallel to the X axis). This width a is equal to the width of a secondary coil. The movements of the target 2 are symbolized by the arrows $f_+$ (to the right, in FIG. 2A) and $f_-$ (to the left), respectively.

The height, according to the Y axis of FIG. 2A, of the secondary coil winding in the direction perpendicular to the movement, $f_+$-$f_-$, is designated by b. Advantageously, the width "a" is selected according to the X axis of the tooth, which is equal to the width of a coil of the secondary winding according to this axis, the two secondary windings being identical.

The operation of the transducer 1 and target 2 set will now be described, when the latter is carried in reciprocating translatory motion by the plate P (FIG. 1).

As FIG. 2C more particularly shows, the primary coil 13 is fed, at its two input terminals, 1300 and 1301, by an advantageously sinusoidal alternating current source $I_0$, in the radio frequency range. To fix the concepts, the frequency $f_0$ of this current $I_0$ is typically on the order of 200 kHz. These radio frequencies induce eddy currents in the target 2.

At any moment, the electromotive force which is induced at the terminals of one of the two secondary coils, for example 11, is subtracted from the electromotive force which develops at the terminals of the other secondary coil, for example 12, because of the above-mentioned "series opposition" mounting.

More precisely, the voltage force $e_s$ induced between the output terminals, 1100 and 1200, of the two secondary coils, 11 and 12, results from the following contributions:

the voltage $e_1$ induced by the primary coil 13 in the first secondary coil 11;

the voltage $e_{1f}$ induced by the eddy currents present in the target 2 in the first secondary coil 11;

the voltage $e_2$ induced by the primary coil 13 in the second secondary coil 12; and the voltage $e_{2f}$ induced by the eddy currents present in the target 2 in the second secondary coil 12.

Because of the "series opposition" mounting of the two secondary coils, 11 and 12, the following equation is met:

$$e_s = (e_2 - e_{2f}) - (e_1 - e_{1f}) \qquad (1)$$

As the two secondary coils, 11 and 12, are identical and symmetrical, the equation:

$$e_1 = e_2 \qquad (2)$$

is also met.

By combining the equations (1) and (2), the following equation is finally obtained:

$$e_s = e_{1f} - e_{2f} \qquad (3)$$

From the examination of the equation (3), it emerges that the voltage that develops between the terminals 1100 and 1200 of the secondary coils, 11 and 12, mounted in "series opposition," only depends on the difference in the voltages induced by the eddy currents generated in the target 2.

The value of the voltage $e_s$ essentially depends on the following parameters:

the distance h (FIG. 2A) between the target 2 and the transducer 1 and the movement of the target above the transducer;

the type of conductive metal of which the target 2 is composed; and the shape of the target 2 and the excitation frequency $f_0$ of the current injected $I_0$ into the primary coil 13.

The distance h is constant in the embodiment of the sensor according to the present invention, the target 2 being driven by a reciprocating translatory motion, $f_+$ and $f_-$, between two extreme positions (not expressly referenced).

The conductive metal forming the target 2 may or may not be ferromagnetic. However, in practice, ferromagnetic targets have problems because they generate a magnetic hysteresis, which has a tendency to degrade the precision of the measurement.

The use of stainless steel is not recommended for the applications intended by the present invention, because residual magnetisms, which may interfere with the measurement (by introducing a hysteresis) appear in the stainless steel beyond a temperature of 150° C.

Preferentially, but not exclusively, aluminum shall be used.

The voltage $e_s$ at the terminals of the secondary coils, 11 and 12, is due to the different overlapping surfaces of these secondary coils by the target 2. When the target 2 overlaps the entire surface of one of the two secondary coils, 11 or 12, the output signal $e_s$ is zero if the target 2 exactly overlaps the same surface of both of the secondary coils, 11 and 12, i.e., when the axis of symmetry (not shown) of the target 2 coincides with the axis of symmetry Δ of these secondary coils, 11 and 12.

The following equations are met, at least with a good approximation:

$$e_{1f} = k(a+x) \qquad (4)$$

$$e_{2f} = k(a-x) \qquad (5)$$

with k being the proportionality constant, a being the above-mentioned width of the metal strip forming the tooth 20, and x being an offset parallel to the X axis, in relation to the Δ axis, of the target 2.

By combining equations (4) and (5) and by taking equation (3) into account, $$e_s = 2kx \qquad (6)$$

is finally obtained.

The output voltage is shown more generally by the curve in FIG. 2D: $e_s$ as a function of the abscissa X. It passes through two maxima, $+e_{max}$ and $-e_{max}$, positive and negative, respectively, for the abscissas $+x_{max}$ and $-x_{max}$, in relation to the Δ axis. The voltage $e_s$ breaks down for the case indicated above. In practice, only the linear central zone of the curve, between $+x_{max}$ and $-x_{max}$, is used. It corresponds to the approximation indicated, the equation (6) thus being met and the voltage $e_s$ being a linear function of the movement of the target 2 according to the X axis and therefore its instantaneous position.

It is clear that it is also possible to arrange a plurality of differential structures of the type that will be described in a series in order to increase the measurement range.

The third component of the sensor, which will henceforth be referenced 6 (symbolized by a box with dotted lines), i.e., the conditioner 3, will now be described, with reference to FIG. 3, and its operation will be described.

FIG. 3 very schematically shows the three principal components of the sensor 6 and their interconnections: the transducer 1, the target 2 and the conditioner 3.

The target 2, as was indicated above, is mechanically connected to the plate P or to the valve S (symbolized by a single box with dotted lines) and follows its reciprocating translatory motion.

The conditioner 3 receives, at input terminals globally referenced as $e_c$, the output signals $e_s$ generated by the transducer 1 (output terminals 1100 and 1200), via jumpers 4. It may comprise, as shown in FIG. 3, internal circuits (not shown) generating the current $I_0$ with a radio frequency $f_0$. Of course, this current can be generated by external circuits, but, in any case, it must be sent to the circuits of the conditioner 3, as specified below. In the example described, second jumpers 5 convey the current $I_0$ to the input terminals 1300 and 1310 of the transducer 1.

The signal $V_s$ generated at the output terminals, 30 and 31, of the conditioner 3 is obtained by synchronous demodulation of the signal $e_s$ by means of a reference signal at the frequency $f_0$.

Synchronous detection is known per se to the person skilled in the art, and it is unnecessary to describe it in detail. Synchronous demodulation makes it possible to detect circuit signals of very weak amplitude, by means of amplifiers, known under the English name "Phase Locked Loop" or "PLL", and filters. In practice, these signals are undetectable by classical measurement apparatus.

Preferentially, as suggested by FIG. 3, the conditioner 3 is arranged at a distance from the "transducer 1-target 2" set.

FIG. 4 very schematically shows a synchronous detection circuit, with reference number 33. It comprises two input channels, a reference signal $V_{ref}$ and the signal to be measured, of very weak amplitude, i.e., $e_s$, both characterized by an identical frequency $f_0$.

The reference signal $V_{ref}$ has a sufficient amplitude to be detectable by conventional means. Therefore, it enables the synchronous detection circuit 33 to focus the detection on the frequency $f_0$. Consequently, the signal $e_s$, a priori embedded in the noise, is filtered at input and at output at the frequency $f_0$ by filters (not shown) of appropriate selectivity, accompanied by a circuit of the above-mentioned "PLL" type. The time constant, which shall be called $T_c$, of the output filters makes it possible to reduce the pass-band of the "PLL" circuit, so as to be positioned on $f_0$ more precisely. The noise diminishing the signal $e_s$ may thus be almost eliminated.

In one embodiment, the synchronous detection comprises four output terminals (not shown in detail) delivering the real component of the output signal $V_s$, the imaginary component of this signal, its module and its phase, respectively.

The arrangements that are characteristic of the present invention—using a synchronous demodulation and the symmetry of the windings of the eddy current sensor—make it possible to meet the features and the operation constraints mentioned in the preamble to the present specification.

Practical configurations of position sensors according to the present invention will now be described with reference to FIGS. 5A and 5B, and in particular as concerns the integration of the target 2 in an electromagnetic or electromechanical valve actuator.

In fact, there are two possible principal configurations:

FIG. 5A: mounting of the target 2 between the two, high $EA_H$ and low $EA_B$, solenoids of the actuator; and FIG. 5B: mounting of the target 2 at the end of the rod $T_1$ of the actuator.

In the two configurations, the actuator is identical or at least quite similar to the actuator described in regard to FIG. 1. Reference shall be made to this figure and to the description thereof that was provided.

In the configuration of FIG. 5A, the target 2 is carried by the plate P along a reciprocating translatory motion of same (arrows $f_+$ and $f_-$), via the intermediary of a classical mechanical fixation device 7 securing it to the plate P.

In the configuration of FIG. 5B, the target 2 is carried by the rod $T_1$, at one of the ends of which it is secured, by any appropriate classical fixation means 7' (not expressly shown). This rod $T_1$ carries the target 2 along the reciprocating translatory motion (arrows $f_+$ and $f_-$) of same.

In both configurations, the transducer 1 is immobile in a space defined by the orthonormed pitch, roll and yaw axes XYZ (FIG. 2A). The conditioner 3 (FIG. 3) was not shown.

An example of a practical embodiment of the integration of a sensor according to the present invention in an electromagnetic or electromechanical valve actuator will now be described with reference to FIG. 6.

The configuration of FIG. 6 corresponds to that of FIG. 5B, as concerns the positioning of the target 2.

The sensor 6 has a configuration of circular revolution inside the spring $R_H$, centered on the axis $\Delta_s$ of the rod $T_1$ which extends it.

The target 2 is secured to the rod $T_1$ by the above-mentioned classical fixation means 7'. This target comprises a plurality of teeth 21.

The transducer 1 is contained between an external tubular wall 8, advantageously made of aluminum, and an internal tubular wall 9, made of an electrical insulating material, for example, of a plastic material.

The unit is integral with the frame M of the actuator and is closed by a plug Bt for adjusting the spring rate (RH) and the positioning of the sensor in relation to the target. This plug comprises an upper central opening OBt.

The other devices of the sensor 6: conditioner 3, etc., were not shown. As was indicated above, the conditioner 3 is preferentially arranged away from the unit.

These arrangements have a plurality of advantages.

The external tube 8, which is made of a material that conducts electricity, contributes to protecting the transducer 1 against the effects of magnetic fields outside the sensor 6, which vary with the movement of the springs, $R_B$ and $R_H$ (FIG. 1). This external tube 8 thus provides a good electromagnetic protection.

Since the transducer 1 is wound around an insulating material 9 which surrounds the target 2, the interferences due to possible asymmetries between the target 2 and the transducer 1 are minimized. In addition, the insulating material 9 participates in the protection of the transducer 1 against the corrosive environment into which it is dipped.

As was indicated, in a preferred embodiment, the primary circuit 13 (see FIG. 2C) and the secondary circuits 11 and 12, of the transducer 1 are flat coils printed or engraved on flexible circuits, advantageously polyimide films, for example, based on Kapton® (registered trademark of the DuPont company).

Kapton® is a highly resistant material that may be used at very high temperatures, on the order of 220° C., which makes it quite compatible with the applications intended by the present invention. Moreover, it has the following advantages:

it provides thermal protection of the primary and secondary circuits of the transducer;

it protects these circuits against the corrosive environment into which they are dipped; and the flexibility of the flexible circuit made of Kapton® makes it possible to insert a small transducer into the reduced, available environment of electromagnetic actuators.

The design of the primary and secondary circuits is capable of assuming a great number of configurations.

To fix the concepts by way of a nonexhaustive illustration, FIGS. 7A through 7L schematically show various possible configurations of the primary circuit, $13_i$, and of the secondary circuits, $11_i$ and $12_i$, meeting the requirements set for a transducer $1_i$ according to the present invention, i being an index that has the values a through l for the respective FIGS. 7A through 7L.

In all the configurations, the secondary circuits, $11_i$ and $12_i$, are mounted in "series opposition" and these configurations have a perfect symmetry in relation to a central axis $\Delta$ (see FIG. 2C).

The substrate 10 may be identical from one configuration to another. For this reason, it is not associated with a particular index i.

After reading the above, it is easily observed that the present invention readily achieves the objectives sought.

The sensor according to the present invention, using eddy currents and being associated with a synchronous demodulation, has numerous advantages, which have been enumerated and which it is unnecessary to repeat. It makes telemetry possible, in particular.

However, it must be clear that the present invention is not limited to only the exemplary embodiments explicitly described, in particular in relation to FIGS. 2A through 7L.

Likewise, the selection of particular materials and the numerical values mentioned come from a technological choice, within the reach of the person skilled in the art, and these were only specified to better describe the technical features of the device according to the present invention.

The invention claimed is:

1. A position sensor of a first device secured to an electromagnetic or electromechanical valve actuator, intended for an internal combustion engine, the first device being driven by a reciprocating translatory motion along a fixed direction in synchronism with a motion of the valve, the position sensor comprising:
   a target made of electrically conductive material, secured to the first device, so as to follow the reciprocating translatory motion,
   a transducer comprising:
   a first winding fed by a alternating current of fixed frequency,
   second and third windings connected according to a series opposition configuration by a first common end, and electromagnetically coupled to one another, the first winding inducing eddy currents in the target and being electromagnetically coupled to the second and third windings,
   a fixed substrate for the first to third windings, the first to third windings being arranged in such a way that an output voltage generated by the transducer, which is proportional to a difference between voltages induced by the eddy currents in the second and third windings, respectively, develops, by electromagnetic induction, between the second ends of the second and third windings, and,
   a conditioner circuit, receiving, on a first input channel, the output voltage and, on a second input channel, a reference alternating electric signal with a frequency substantially identical to the fixed frequency, the conditioner circuit comprising a synchronous demodulation circuit, so as to generate, at an output terminal, an electric signal representative of an instantaneous position of the target along the fixed direction.

2. A sensor in accordance with claim 1, wherein the conditioner circuit is offset in relation to the transducer, the conditioner circuit being placed in a location substantially protected from thermal gradients and from physicochemical corrosions.

3. A sensor in accordance with claim 1, wherein the first, second and third windings are arranged symmetrically in relation to an axis linked with the substrate.

4. A sensor in accordance with claim 1, wherein the valve actuator comprises a plate arranged between two solenoids, a high solenoid $EA_H$ and a low $EA_B$ solenoid, the plate being attached to a rod for driving a valve, and wherein the first device to which the target is secured is composed of the plate or the driving rod.

5. A sensor in accordance with claim 1, wherein the valve is extended by a valve stem device, the target is attached to the valve stem device, the first device and the target communicates the reciprocating translatory motion to the first device.

6. A sensor in accordance with claim 1, wherein the fixed frequency is in the radio frequency range.

7. A sensor in accordance with claim 1, wherein the target is a metal rod comprising at least one tooth arranged along the fixed direction.

8. Sensor in accordance with claim 7, wherein the electrically conductive material of the target is aluminum.

9. A sensor in accordance with claim 1, wherein the first to third windings are composed of flat coils, engraved or printed on a flexible substrate.

10. A sensor in accordance with claim 9, wherein the flexible substrate is made of polyimide.

11. A sensor in accordance with claim 9, wherein the first winding comprises a plurality of turns coiled around said secondary windings connected in series opposition.

12. A sensor in accordance with claim 1, wherein the synchronous demodulation circuit of the conditioner circuit comprises a phase locked loop.

13. A sensor in accordance with claim 1, wherein the actuator comprises a frame, the transducer and the target are arranged in an opening of this frame, which opening is closed by a plug for adjusting a rate of a spring and for positioning the sensor in relation to the target, the transducer being arranged coaxially to the target inside a tube forming an external wall.

14. A sensor in accordance with claim 13, wherein the tube is made of a material offering protection against electromagnetic fields.

15. A sensor in accordance with claim 13, wherein the transducer comprises a internal wall made of an electrically insulating material.

16. A sensor in accordance with claim 1, wherein the conditioner circuit is at a distance from the transducer and from the target, and wherein the conductor circuit receives the output voltage generated by the transducer by means of jumpers, so as to create a telemetry system.

17. A sensor in accordance with claim 16, wherein, with the engine comprising a plurality of valves, including said valve, and a plurality of valve actuators, including said valve actuator, each of the valves being associated with a transducer, the sensor includes a plurality of conditioner circuits, including said conditioner circuit, each conditioner circuit receiving an output voltage generated by the associated transducer, the plurality of conditioner circuits being arranged in a single integrated circuit.

* * * * *